United States Patent
Suau et al.

(10) Patent No.: US 9,950,956 B2
(45) Date of Patent: Apr. 24, 2018

(54) (METH)ACRYLIC COMB POLYMER CONTAINING A (METH)ACRYLIC ESTER AS A DISPERSING AND ANTI-DEFOAMING AGENT IN AN AQUEOUS SUSPENSION OF CALCIUM SULFATE HEMIHYDRATE

(75) Inventors: Jean-Marc Suau, Lucenay (FR); Yves Kensicher, Theize (FR)

(73) Assignee: COATEX, Genay (FR)

( * ) Notice: Subject to any disclaimer, the term of this patent is extended or adjusted under 35 U.S.C. 154(b) by 1164 days.

(21) Appl. No.: 12/761,435

(22) Filed: Apr. 16, 2010

(65) Prior Publication Data

US 2010/0304167 A1 Dec. 2, 2010

Related U.S. Application Data

(60) Provisional application No. 61/183,661, filed on Jun. 3, 2009.

(30) Foreign Application Priority Data

May 28, 2009 (FR) ...................................... 09 53525

(51) Int. Cl.
| | | |
|---|---|---|
| *C04B 28/14* | (2006.01) | |
| *C04B 24/26* | (2006.01) | |
| *C04B 103/00* | (2006.01) | |
| *C04B 103/40* | (2006.01) | |
| *C04B 103/50* | (2006.01) | |
| *C04B 111/00* | (2006.01) | |

(52) U.S. Cl.
CPC ........... *C04B 28/14* (2013.01); *C04B 24/2688* (2013.01); *C04B 2103/006* (2013.01); *C04B 2103/408* (2013.01); *C04B 2103/50* (2013.01); *C04B 2111/0062* (2013.01); *Y10T 428/31996* (2015.04)

(58) Field of Classification Search
None
See application file for complete search history.

(56) References Cited

U.S. PATENT DOCUMENTS

| | | | |
|---|---|---|---|
| 6,264,739 B1 | 7/2001 | Yamato et al. | |
| 7,232,875 B1 | 6/2007 | Liotta, Jr. et al. | |
| 2003/0019401 A1* | 1/2003 | Schwartz et al. | 106/772 |
| 2004/0209979 A1 | 10/2004 | Schwartz et al. | |
| 2006/0142498 A1* | 6/2006 | Gane et al. | 525/242 |
| 2009/0182061 A1 | 7/2009 | Moro et al. | |

FOREIGN PATENT DOCUMENTS

FR 2 900 930 A1 11/2007

* cited by examiner

*Primary Examiner* — Chinessa T Golden
(74) *Attorney, Agent, or Firm* — Oblon, McClelland, Maier & Neustadt, L.L.P.

(57) ABSTRACT

This invention relates to the use, in a foamy aqueous suspension of calcium sulfate hemihydrate, as an agent having the dual function of being a dispersing agent and an anti-defoaming agent, of a comb polymer made up of (meth)acrylic acid, a monomer which is an alcoxy- or hydroxy-polyalkylene glycol, and an ester of (meth)acrylic acid. It also relates to the aqueous suspensions thereby formed, and the plasterboard manufactured from 2 sheets of paper containing a body resulting from the drying of said suspensions.

17 Claims, No Drawings

(METH)ACRYLIC COMB POLYMER CONTAINING A (METH)ACRYLIC ESTER AS A DISPERSING AND ANTI-DEFOAMING AGENT IN AN AQUEOUS SUSPENSION OF CALCIUM SULFATE HEMIHYDRATE

REFERENCE TO PRIOR APPLICATIONS

This application claims priority to U.S. provisional application 61/183,661 filed Jun. 3, 2009, and to French patent application 09 53525 filed May 28, 2009, both incorporated herein by reference.

FIELD OF THE INVENTION

This invention relates to the field of additives used in aqueous suspensions of calcium sulfate hemihydrate, useful for example in manufacturing plasterboard.

Additional advantages and other features of the present invention will be set forth in part in the description that follows and in part will become apparent to those having ordinary skill in the art upon examination of the following or may be learned from the practice of the present invention. The advantages of the present invention may be realized and obtained as particularly pointed out in the appended claims. As will be realized, the present invention is capable of other and different embodiments, and its several details are capable of modifications in various obvious respects, all without departing from the present invention. The description is to be regarded as illustrative in nature, and not as restrictive.

BACKGROUND OF THE INVENTION

The first step in manufacturing plasterboard typically resides in manufacturing an aqueous suspension of calcium sulfate hemihydrate. In concrete terms, hemihydrate in the form of a powder is added to water being agitated in a mixer in the presence of a dispersing agent. It becomes hydrated when it contacts the water, forming calcium sulfate dihydrate, meaning gypsum.

The function of the dispersing agent is to ensure that the calcium sulfate hemihydrate is in an even state of dispersion within the aqueous phase; its effectiveness may particularly be measured by the quantity of calcium sulfate hemihydrate that is dispersable in order to obtain a given rheology (or viscosity value). These agents are called "dispersing", "water-reducing", and "plastifying" agents, and/or are said to improve the "consistency" or "fluidity" of the gypsum suspension.

Various additives are added in parallel in the aqueous suspension, such as gluing agents, accelerators, etc. It is then mixed with foam taken from a generator (the water is injected into a turbine in the presence of a foaming agent), then sandwiched between two rolling paper strips. The whole article is then cut into the desired dimensions of plasterboard. Regarding the manufacturing of such boards, one may refer to the documents U.S. Pat. No. 5,879,446 and the Kirk-Othmer Encyclopedia of Chemical Technology (Second Edition 1970, vol 21, pp. 621-24, and fourth edition 1992, vol 4, pp. 618-619).

The mixture between the suspension of calcium sulfate hemihydrate and foam only lasts a few seconds. However, as the structure of the foam is particularly sensitive to agitations in the environment, it often degrades during this step. Such degradation leads to the formation of large bubbles which affect the adhesion of the suspension of calcium sulfate hemihydrate onto the strips of paper; it is therefore necessary to overdose the quantity of foaming agent—which accordingly decreases the productivity of the method—in order to obtain the desired quantity of foam. This issue is recounted clearly in the documents JP 08-217505 and U.S. Pat. No. 6,264,739.

The foam is also sensitive to the nature of the dispersing agent. The person skilled in the art initially used lignosulfate and naphtalene-sulfonate products, but their effectiveness at dispersing quickly proved insufficient. So-called "comb" dispersing agents were then engineered, made of a (meth) acrylic skeleton onto which are grafted alcoxy- or hydroxy-polyalkylene glycol lateral chains.

Examples of such dispersing agents are found in the patents JP 08-217505 and U.S. Pat. No. 6,264,739, both incorporated herein by reference, cited above. These documents deal with the question of interactions between the foam and the dispersing agent, by way of tests based on the mixture of foam and a suspension of calcium sulfate hemihydrate containing a dispersing agent. This mixture is produced during agitation for a quarter hour. It is therefore a "close" mixture between the components, created for a time which is very long compared to the few seconds in industrial-scale operations.

The results obtained according to these two patents appeared to the inventors to demonstrate that naphtalene-sulfonate dispersing agents are much more destructive to foam than their comb counterparts. However, the structure of the foam is altered by the very nature of the method that is used: the 15 minutes of mixing necessarily destructure the foam, and it was reasonable to question just how representative the results obtained were.

SUMMARY OF THE INVENTION

The inventors have now demonstrated, under conditions which are very close to reality, that comb dispersing agents lead to a more noteworthy decrease in foam than do naphtalene sulfonate products. These results were obtained using tests that reproduce industrial reality as close as possible, and are described in the representative examples illustrating this application, to which the claims are not limited.

DESCRIPTION OF THE PREFERRED EMBODIMENTS

Continuing their research into the field of comb polymers used for foamy aqueous suspensions of calcium sulfate hemihydrate, the inventors have successfully demonstrated that adding a (meth)acrylic acid ester-based termonomer led to an improved anti-defoaming power, without altering such polymers' effectiveness as dispersing agents. The expression "anti-defoaming power" does not mean that said polymer generates foam, but rather that, in the presence of foam, its interaction with it is limited: it destructures little or none of said foam.

Although the previous documents may suggest that, among a great many variants, such a monomer could be used in manufacturing comb dispersing agents, they did not contain any example supporting such a possibility. Additionally, they provided no insight into the roles that an ester could play with respect to the foam, this ester being copolymerized with the other monomers of the comb dispersing agent.

Entirely surprisingly, the tests conducted by the inventors which, among other things, have led to the present invention have, under conditions much closer to reality than those described in the documents JP 08-217505 and U.S. Pat. No. 6,264,739, unambiguously demonstrated the advantage afforded by an ester of (meth)acrylic acid, if it is used in synthesizing the comb polymers: not only is the resulting polymer's effectiveness as a dispersing agent unaltered, but also its anti-defoaming power is improved.

Thus, a first object of the invention is a comb polymer wherein it comprises, consists essentially of, or consists of:
  a) at least one monomer which is (meth)acrylic acid,
  b) at least one monomer which is an ester of (meth)acrylic acid, and
  c) at least one monomer which is an alcoxy- or hydroxy-polyalkylene glycol.

Of course, and as with all invention comb polymers described herein, the invention is also directed to their use as a dispersing and/or anti-defoaming agent in a foamy aqueous suspension of calcium sulfate hemihydrates and in the further use of such aqueous suspensions of calcium sulfate hemihydrates.

The expression "foamy aqueous suspension of calcium sulfate hemihydrate" means that the anti-defoaming function of the polymer according to the invention is only expressed beginning at the moment when the foam comes in contact with said aqueous suspension.

The manufacturing of comb polymers described herein is within the skill of a person skilled in the art, particularly in a continuous, semi-continuous, or batched process. Examples of such processes may particularly be found in documents U.S. Pat. No. 6,815,513; U.S. Pat. No. 6,214,958; U.S. Pat. No. 664,360 and U.S. Pat. No. 7,232,875, all incorporated herein by reference.

Preferred invention comb polymers, regardless of their use herein, are made up, expressed as a percentage by weight of each of its components, the total being equal to 100%, of:
  a) from 5% to 30%, preferentially from 15% to 25% of at least one monomer which is (meth)acrylic acid,
  b) from 1% to 20%, preferentially from 5% to 10% of at least one monomer which is an ester of (meth)acrylic acid,
  c) from 70% to 90%, preferentially from 75% to 85% of at least one monomer which is an alcoxy- or hydroxy-polyalkylene glycol,
the sum of percentages a), b) and c) being equal to 100%. The term "(meth)acrylic acid" as used herein includes methacrylic acid, acrylic acid, and both methacrylic acid and acrylic acid. Not all invention comb polymers need be made up of only monomers a), b), and c) above. For example, the sum of percentages a), b) and c) need not be equal to 100% but preferably are at least 50% and above, including 60%, 70%, 75%, 80%, 85%, 90% and 95%. In addition, no matter the sum of percentages a), b) and c), the relative ratios of these monomers are preferably as stated above—5-30%, preferably 15-25% a), 1-20%, preferably 5-10% b), etc.

Monomer a) is preferentially methacrylic acid. Monomer b) is preferentially chosen from among ethyl acrylate, butyl acrylate, and methyl methacrylate. Monomer c) is preferably a monomer of formula (I):

$R-(A-O)_m-(B-O)_n-R'$      (I)

m and n are integers less than 150, at least one of which is nonzero,
  A and B designate alkyl groups which are different from one another, and having 2 to 4 carbon atoms, the group AO preferentially designating ethylene oxide and the group BO preferentially designating propylene oxide,
  R designates a polymerizable unsaturated function,
  R' represents hydrogen or an alkyl group having 1 to 4 carbon atoms, and preferentially hydrogen.

The structures $-(A-O)_m-(B-O)_n-$ designate either block or random structures, both within the present Application.

Comb polymers according to the invention can be obtained, for example, by radical polymerization in a solution, in a direct or reverse emulsion, in a suspension or precipitation in solvents, in the presence of catalytic systems and transfer agents, or by controlled radical polymerization methods, and preferably by nitroxide-mediated polymerization (NMP) or cobaloxime-mediated polymerization, atom transfer radical polymerization (ATRP), or sulfur derivative-mediated radical polymerization, said derivatives being chosen from among carbamates, dithioesters or trithiocarbonates (RAFT) or xanthates.

Comb polymers according to the invention can optionally be fully or partially neutralized by one or more neutralization agents having a monovalent or polyvalent cation, said agents preferentially being chosen from among ammonium hydroxide or from among calcium or magnesium hydroxides and/or oxides, or from among sodium, potassium, or lithium hydroxides, or from among aliphatic and/or cyclic primary, secondary, and tertiary amines, preferentially such as stearylamine, ethanolamines (mono-, di, triethanolamine), mono- and diethylamine, cyclohexylamine, methylcyclohexylamine, methyl propanol amino, morpholine, and preferentially in that the neutralization agent is chosen from among triethanolomine and sodium hydroxide.

Comb polymers according to the invention can be separated into several phases, using static or dynamic processes, by one or more polar solvents preferentially belonging to the group made up of water, methanol, ethanol, propanol, isopropanol, butanols, acetone, tetrahydrofuran, or mixtures thereof.

A further object of the invention resides in a foamy aqueous suspension of calcium sulfate hemihydrate, comprising one or more comb polymers described above. Preferred comb polymers are those made up:
  a) of at least one monomer which is (meth)acrylic acid,
  b) of at least one monomer which is an ester of (meth)acrylic acid,
  c) of at least one monomer which is an alcoxy or hydroxy-polyalkylene glycol.

This aqueous suspension is further wherein said comb polymer is preferably made up, expressed as a percentage by weight of each of its components, the total being equal to 100%:
  a) from 5% to 30%, preferentially from 15% to 25% of at least one monomer which is (meth)acrylic acid,
  b) from 1% to 20%, preferentially from 5% to 10% of at least one monomer which is an ester of (meth)acrylic acid,
  c) from 70% to 90%, preferentially from 75% to 85% of at least one monomer which is an alcoxy- or hydroxy-polyalkylene glycol,
the sum of percentages a), b) and c) being equal to 100%.

The amount of comb polymer(s) present in the foamy aqueous suspension of calcium sulfate hemihydrate described herein is not limited but preferably contains, expressed as a percentage by dry weight of polymer in relation to the dry weight of calcium sulfate hemihydrate, of 0.005% to 0.5%, preferentially from 0.02% to 0.35% of said comb polymer(s).

A further object of the invention resides in plasterboard comprising 2 sheets of paper and a body resulting from the drying of a foamy aqueous suspension of calcium sulfate hemihydrate containing one or more comb polymers characterized above. More than 2 sheets of paper may be used, for example, 3, 4, etc. Preferably the body results from the drying of a foamy aqueous suspension of calcium sulfate hemihydrate containing one or more comb polymers as characterized above in-between 2 sheets of paper. A given plasterboard may have more than one body, especially if there are more than 2 sheets of paper, each of which may be the same or different. A typical configuration is one body sandwiched between 2 sheets of paper.

The following examples illustrate the present invention, without limiting its scope.

EXAMPLES

In all examples, the molecular weight of the polymers used is determined based on the method explained below, using triple-detection Size Exclusion Chromatography (3D-SEC).

The SEC 3D chain is made up of:
an ERC 3112 inline degasser for a moving phase,
a Waters 515 or Viscotek VE1121 isocratic pump,
a Waters 717+ automatic injector,
a Waters CHM column heater,
a set of 3 Waters Ultrahydrogel columns 30 cm long and with an internal diameter of 7.8 mm, 1 linear column followed by 2 120 Å columns, all preceded by a guard column of the same nature,
a set of detectors connected in parallel: Viscotek T60A combining LS and viscosimetry and a Waters 2410 differential refractometer
a computer system and software: Viscotek TriSEC 3.0 GPC software Composition of the mobile phase:
preparing a parent solution: $Na_2SO_4$ 666 mM, filtered at 0.1 μm
preparing the mobile phase at 66.6 mM of $Na_2SO_4$ (i.e. an ionic force of 0.2 M):
    10% by volume of the aforementioned parent solution,
    5% by volume of acetonitrile,
    85% by volume of water at 18.2 MΩ,
    pH adjusted to 9.0 by a few drops of sodium hydroxide N.

Operational Parameters:
flow rate: 0.8 mL/min
temperature of the columns and the refractometer: 40° C.
injection volume: 100 μl
polymer concentration at injection: 2 to 4 mg/mL depending on the expected average molar mass for each sample (optimization of the detectors' responses),
duration of analysis: 50 min Calibrating the Detectors:
Use of two certified masters:
Viscotek PEO22k, a standard of low polydispersity (Ip) for calibration of the system proper,
Viscotek Dextran T70k, a standard of high polydispersity (Ip) for verification and fine tuning of the calibration.

In the tests that follow, first an aqueous suspension of calcium sulfate hemihydrate was created in the presence of a polymer according to the prior art or the invention, whose "fluidity" was then determined. This fluidity is expressed as a percentage water reduction, which may be produced within said suspension, in view of maintaining its constant fluidity and that, for a given dispersing agent level (meaning that the quantity of water in the suspension is successfully reduced for that dispersing agent level, while keeping its viscosity at a certain value). This percentage was determined for a dispersing agent level fixed arbitrarily at 0.3% by weight of dry polymer in relation to the dry weight of the calcium sulfate hemihydrate. The greater this percentage is, the better the dispersing power of the polymer in question is.

Second, using a particular procedure, the experimental conditions of bringing the previously obtained suspension into contact with the foam are simulated. Each polymer's capacity to stabilize foam was determined by measuring the density of the mixture formed by the suspension and the foam. The lower this density is, the better the anti-defoaming power of the polymer in question is.

1. Measuring the Percentage of Water Reduction:

The percentage of water reduction based on the dose of dispersing agent is measured by creating a dispersion of calcium hemihydrate with a constant viscosity. This constant viscosity is maintained by reducing the quantity of water used to compensate for the decrease in viscosity caused by increasing the dose of the dispersing agent. The method used is as follows.

1.1 Determining the Quantity of Water Needed in the Absence of Dispersing Agent.

In a 250 mL beaker, 37 g of water is weighed out, 50 g of calcium sulfate hemihydrate is added, and it is left to sit for 60 seconds to moisten the powder. It is carefully agitated for 30 seconds using a spatula, and the dispersion obtained is poured onto a glass plate.

The edge of the beaker must be about 90 mm from the plate.

The diameter of the plaster cake thereby formed is measured, which must be 90 mm. If the diameter of the cake is greater than 90 mm, a test is redone reducing the quantity of water used; otherwise, the test is redone increasing the quantity of water. The quantity of water used to obtain a 90 mm cake is the baseline value used for the remainder of the tests.

1.2 Determining the Percentage of Reducing Water Based on the Dose of Dispersing Agent Used:

The previous procedure is used adding a defined quantity of dispersing agent into the calcium sulfate hemihydrate mixing water. The quantity of dispersing agent is calculated to conduct tests with 0.3% of dispersing agent by solids content in relation to the calcium sulfate hemihydrate. For each dose of dispersing agent, the quantity of water is adjusted by means of successive tests in order to obtain a cake 90 mm in diameter. The results are expressed as a percentage of water reduction (in relation to the test with no dispersing agent) depending on the percentage of dispersing agent calculated by solids content in relation to the calcium sulfate hemihydrate.

2. Measuring the Density of the Foamy Aqueous Suspension of Calcium Sulfate Hemihydrate:

The density of the aqueous suspension of foamed gypsum is measured by simultaneously creating, using 2 motor mixers, the dispersion of calcium sulfate hemihydrate and foam. These 2 formulations are then mixed, and the density of a fixed volume of the mixture is then measured by weighing.

2.1 Preparing the Foam:

A Hamilton Beach mixer or equivalent equipment, equipped with a stainless steel bowl about 900 mL in volume. Into the bowl, 130 g of water are weighed out, and then 0.2 g of foaming agent (Steol™ FA 406 from the company STEPAN™) are added. The Hamilton Beach is then set to agitate for one minute at speed 3, during which time the dispersion of calcium sulfate hemihydrate is prepared so that both formulations are ready at the same time.

2.2 Preparing the Dispersion of Calcium Sulfate Hemihydrate:

A Waring Professional Food & Beverage Blender MBB518 mixer is used, equipped with a 1-liter mixing bowl, or equivalent equipment. In a mixing bowl, 193 g of water are weighed out, 0.2 g by dry weight of polymer, and it is mixed carefully. 407 g of calcium sulfate hemihydrate are then quickly added and it is mixed using a motor for 7 seconds at a speed of about 21,000 rpm.

2.3 Creating a Mixture of Both Formulations and Measuring the Density:

Both formulations are added simultaneously into a Kenwood Chef Classic planetary mixer or equivalent equipment, equipped with a running K beater, and are mixed for a very short time of 20 seconds, and at a very low speed of 50 rpm. The mixture obtained is then used to fill a 300 mL glass beaker to full, which is leveled down and then weighed. A net mass of 300 g will therefore indicate a density of 1.00.

Test #1

This test illustrates a comparative material, and uses a polynaphtalene sulfonate sold by the company GEO SPECIALTY CHEMICALS™ (Horsham, Pa.) under the name Diloflow™ GW.

Test #2

This test illustrates a comparative material, and uses a polymer whose molecular mass by weight is equal to 75,000 g/mol, fully neutralized by sodium hydroxide, and made up, expressed as a percentage by weight of each of its components, of:
- 12.5% methacrylic acid,
- 87.5% by weight of a monomer with formula (I) in which R represents the methacrylate group, R' represent hydrogen, m=46, n=15, AO designates ethylene oxide and BO designates propylene oxide, the patterns (AO) and (BO) having a random distribution.

Test #3

This test illustrates a comparative material, and uses a polymer whose molecular mass by weight is equal to 60,000 g/mol, fully neutralized by sodium hydroxide, and made up, expressed as a percentage by weight of each of its components, of:
- 20.0% methacrylic acid,
- 80.0% by weight of a monomer with formula (I) in which R represents the methacrylate group, R' represent hydrogen, m=46, n=15, AO designates ethylene oxide and BO designates propylene oxide, called special monomer #1 for short.

Test #4

This test illustrates the invention, and uses a polymer whose molecular mass by weight is equal to 40,000 g/mol, fully neutralized by sodium hydroxide, and made up, expressed as a percentage by weight of each of its components, of:
- 19.3% methacrylic acid,
- 2.8% ethyl acrylate,
- 77.9% by weight of special monomer #1.

Test #5

This test illustrates the invention, and uses a polymer whose molecular mass by weight is equal to 35,000 g/mol, fully neutralized by sodium hydroxide, and made up, expressed as a percentage by weight of each of its components, of:
- 19.3% methacrylic acid,
- 5.6% ethyl acrylate,
- 75.1% by weight of special monomer #1.

Test #6

This test illustrates the invention, and uses a polymer whose molecular mass by weight is equal to 37,000 g/mol, fully neutralized by sodium hydroxide, and made up, expressed as a percentage by weight of each of its components, of:
- 19.3% methacrylic acid,
- 2.8% butyl acrylate,
- 77.9% by weight of special monomer #1.

Test #7

This test illustrates the invention, and uses a polymer whose molecular mass by weight is equal to 44,500 g/mol, fully neutralized by sodium hydroxide, and made up, expressed as a percentage by weight of each of its components, of:
- 19.3% methacrylic acid,
- 5.6% butyl acrylate,
- 75.1% by weight of special monomer #1.

Test #8

This test illustrates the invention, and uses a polymer whose molecular mass by weight is equal to 38,000 g/mol, fully neutralized by sodium hydroxide, and made up, expressed as a percentage by weight of each of its components, of:
- 19.3% methacrylic acid,
- 2.8% methyl methacrylate,
- 77.9% by weight of special monomer #1.

Test #9

This test illustrates the invention, and uses a polymer whose molecular mass by weight is equal to 45,000 g/mol, fully neutralized by sodium hydroxide, and made up, expressed as a percentage by weight of each of its components, of:
- 19.3% methacrylic acid,
- 5.6% methyl methacrylate,
- 75.1% by weight of special monomer #1.

Test #10

This test illustrates the invention, and uses a polymer whose molecular mass by weight is equal to 32,000 g/mol, fully neutralized by sodium hydroxide, and made up, expressed as a percentage by weight of each of its components, of:
- 19.8% acrylic acid,
- 1.0% of alkyl methacrylate consisting of a mixture of 2 groups respectively having 12 and 14 carbon atoms,
- 79.2% by weight of special monomer #1.

Test #11

This test illustrates the invention, and uses a polymer whose molecular mass by weight is equal to 32,000 g/mol, fully neutralized by sodium hydroxide, and made up, expressed as a percentage by weight of each of its components, of:
- 19.8% acrylic acid,
- 5.0% of alkyl methacrylate consisting of a mixture of 2 groups respectively having 12 and 14 carbon atoms,
- 75.2% by weight of special monomer #1.

The results obtained appear in Table 1.

TABLE 1

| Comparative (C)/ INvention (IN) | Test no. | % reduction in water | Density of the foamy suspension |
|---|---|---|---|
| C | 1 | 9.7 | 0.968 |
| C | 2 | 17.2 | 1.166 |
| C | 3 | 17.5 | 1.140 |
| IN | 4 | 19.2 | 1.008 |
| IN | 5 | 20.3 | 1.005 |
| IN | 6 | 20.3 | 1.037 |

TABLE 1-continued

| Comparative (C)/ INvention (IN) | Test no. | % reduction in water | Density of the foamy suspension |
|---|---|---|---|
| IN | 7 | 21.9 | 1.021 |
| IN | 8 | 21.1 | 1.016 |
| IN | 9 | 19.7 | 0.989 |
| IN | 10 | 18.1 | 1.040 |
| IN | 11 | 19.1 | 1.004 |

Looking first at the results obtained for the two products of a comparative material, it is not surprising to see that the comb polymers according to tests #2 and #3 are much better dispersing agents than the naphtalene sulfonate according to test #1. On the other hand, unlike what is instructed by the state of the art, the comb polymers have proven to be agents which destructure the foam in a very significant way, compared to the naphtalene sulfonate.

These results contradict the observations made in documents JP 08-217505 and U.S. Pat. No. 6,264,739. As already indicated, these patents use an operating protocol which is very far from reality, with respect to manufacturing the foamy suspension of gypsum. It is therefore not surprising that their results are now discredited. The inventors, in light of the tests conducted, confirms that in contradiction of these documents, the comb polymers do not necessarily stabilize the foam better than the naphtalene sulfonate.

Looking now at the results obtained with the polymers according to the invention, it may first be seen that the dispersing power of these products is not in any way altered by the presence of an acrylic ester: on the other hand, it is actually slightly improved. Next, it appears that the foam is much less destructured than with the comb polymer of a comparative material, which contains no acrylic ester: density values of the foamy aqueous suspension are obtained on the same order of magnitude as for the naphtalene sulfonate.

In describing polymers herein the inventors often speak of the "monomers" in these polymers. As those of ordinary skill in the art are aware, this is a shorthand convenience, and it is used to describe the monomers that are used to make up the polymers being described.

The above written description of the invention provides a manner and process of making and using it such that any person skilled in this art is enabled to make and use the same, this enablement being provided in particular for the subject matter of the appended claims, which make up a part of the original description.

As used herein, the phrases "selected from the group consisting of," "chosen from," and the like include mixtures of the specified materials. Terms such as "contain(s)" and the like as used herein are open terms meaning 'including at least' unless otherwise specifically noted. The term "mentioned" notes exemplary embodiments, and is not limiting to certain species. As used herein the words "a" and "an" and the like carry the meaning of "one or more."

All references, patents, applications, tests, standards, documents, publications, brochures, texts, articles, etc. mentioned herein are incorporated herein by reference. Where a numerical limit or range is stated, the endpoints are included. Also, all values and subranges within a numerical limit or range are specifically included as if explicitly written out.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly.

The invention claimed is:

1. A foamy aqueous suspension of calcium sulfate hemihydrate, comprising water, calcium sulfate hemihydrate, and a comb polymer comprising, expressed as a percentage by weight of the total weight, monomers a), b) and c):
    a) from 5% to 30% of at least one monomer which is (meth)acrylic acid,
    b) from 1% to 20% of at least one monomer which is an ester of (meth)acrylic acid, and
    c) from 70% to 90% of at least one monomer which is an alcoxy- or hydroxy-polyalkylene glycol,
the sum of percentages a), b) and c) being equal to at least 50% by weight of the total weight of the comb polymer.

2. A foamy aqueous suspension according to claim 1, wherein the sum of percentages a), b) and c) is equal to 100% by weight of the total weight of the comb polymer.

3. A plasterboard comprising two sheets of paper and a body therebetween, the body comprising a dried foamy aqueous suspension comprising water, calcium sulfate hemihydrate and at least one comb polymer according to claim 2.

4. A foamy aqueous suspension according to claim 1, wherein, for said comb polymer, monomer a) is methacrylic acid.

5. A plasterboard comprising two sheets of paper and a body therebetween, the body comprising a dried foamy aqueous suspension comprising water, calcium sulfate hemihydrate and at least one comb polymer according to claim 4.

6. A foamy aqueous suspension according to claim 1, wherein, for said comb polymer, monomer b) is chosen from among ethyl acrylate, butyl acrylate, and methyl methacrylate.

7. A plasterboard comprising two sheets of paper and a body therebetween, the body comprising a dried foamy aqueous suspension comprising water, calcium sulfate hemihydrate and at least one comb polymer according to claim 6.

8. A foamy aqueous suspension according to claim 1, wherein, for said comb polymer, monomer c) is a monomer with formula (I):

$$R\text{-}(A\text{—}O)_m\text{—}(B\text{—}O)_n\text{—}R' \qquad (I)$$

m and n are integers less than 150, at least one of which is nonzero,
A and B designate alkyl groups which are different from one another, and having 2 to 4 carbon atoms,
R designates a polymerizable unsaturated function,
R' represents hydrogen or an alkyl group having 1 to 4 carbon atoms.

9. A plasterboard comprising two sheets of paper and a body therebetween, the body comprising a dried foamy aqueous suspension comprising water, calcium sulfate hemihydrate and at least one comb polymer according to claim 8.

10. A plasterboard comprising two sheets of paper and a body therebetween, the body comprising a dried foamy aqueous suspension comprising water, calcium sulfate hemihydrate and at least one comb polymer according to claim 1.

11. A foamy aqueous suspension according to claim 1, wherein said comb polymer consists of, expressed as a percentage by weight of the total weight, monomers a), b) and c) as follows:

a) from 5% to 30% of methacrylic acid
b) from 1% to 20% of one of ethyl acrylate, butyl acrylate, and methyl methacrylate
c) from 70% to 90% a monomer of formula (I):

  (I)

m and n are integers less than 150, at least one of which is nonzero,
A and B designate alkyl groups which are different from one another, and having 2 to 4 carbon atoms,
R designates a polymerizable unsaturated function,
R' represents hydrogen or an alkyl group having 1 to 4 carbon atoms, the sum of percentages a), b) and c) being equal to 100% by weight of the total weight of the comb polymer.

12. A plasterboard comprising two sheets of paper and a body therebetween, the body comprising a dried foamy aqueous suspension comprising water, calcium sulfate hemihydrate and at least one comb polymer according to claim 11.

13. A comb polymer wherein said comb polymer comprises, expressed as a percentage by weight of the total weight, monomers a), b) and c):
a) from 5% to 30% of at least one monomer which is (meth)acrylic acid,
b) from 1% to 20% of at least one monomer which is an ester of (meth)acrylic acid, and
c) from 70% to 90% of at least one monomer which is an alcoxy- or hydroxy-polyalkylene glycol,
the sum of percentages a), b) and c) being equal to at least 50% by weight of the total weight of the comb polymer.

14. A comb polymer according to claim 13, wherein, for said comb polymer, monomer a) is methacrylic acid.

15. A comb polymer according to claim 13, wherein, for said comb polymer, monomer b) is chosen from among ethyl acrylate, butyl acrylate, and methyl methacrylate.

16. A comb polymer according to claim 13, wherein, for said comb polymer, monomer c) is a monomer with formula (I):

  (I)

m and n are integers less than 150, at least one of which is nonzero,
A and B designate alkyl groups which are different from one another, and having 2 to 4 carbon atoms,
R designates a polymerizable unsaturated function,
R' represents hydrogen or an alkyl group having 1 to 4 carbon atoms.

17. A comb polymer consisting of, expressed as a percentage by weight of the total weight, monomers a), b) and c) as follows:
a) from 5% to 30% of methacrylic acid
b) from 1% to 20% of one of ethyl acrylate, butyl acrylate, and methyl methacrylate
c) from 70% to 90% a monomer of formula (I):

  (I)

m and n are integers less than 150, at least one of which is nonzero,
A and B designate alkyl groups which are different from one another, and having 2 to 4 carbon atoms,
R designates a polymerizable unsaturated function,
R' represents hydrogen or an alkyl group having 1 to 4 carbon atoms,
the sum of percentages a), b) and c) being equal to 100% by weight of the total weight of the comb polymer.

* * * * *